US011898799B2

(12) United States Patent
Kim et al.

(10) Patent No.: US 11,898,799 B2

(45) Date of Patent: Feb. 13, 2024

(54) RPM CONTROL METHOD OF BLOWER FOR GAS FURNACE

(71) Applicant: LG ELECTRONICS INC., Seoul (KR)

(72) Inventors: Jusu Kim, Seoul (KR); Janghee Park, Seoul (KR); Hansaem Park, Seoul (KR); Yongki Jeong, Seoul (KR); Doyong Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 932 days.

(21) Appl. No.: 16/557,163

(22) Filed: Aug. 30, 2019

(65) Prior Publication Data

US 2020/0072555 A1 Mar. 5, 2020

(51) Int. Cl.

| | |
|---|---|
| ***F27D 21/00*** | (2006.01) |
| ***F24H 3/02*** | (2022.01) |
| ***F24H 9/20*** | (2022.01) |
| ***F24H 15/208*** | (2022.01) |
| ***F24H 15/395*** | (2022.01) |
| ***F24H 15/20*** | (2022.01) |
| ***F24H 15/35*** | (2022.01) |

(Continued)

(52) U.S. Cl.

CPC ......... *F27D 21/0014* (2013.01); *F24H 3/022* (2013.01); *F24H 9/2085* (2013.01); *F24H 15/20* (2022.01); *F24H 15/208* (2022.01); *F24H 15/35* (2022.01); *F24H 15/395* (2022.01); *F24H 15/128* (2022.01); *F24H 15/176* (2022.01); *F24H 15/254* (2022.01); *F24H 15/281* (2022.01); *F24H 15/414* (2022.01)

(58) Field of Classification Search

CPC ...... F27D 21/0014; F24H 3/022; F24H 3/065; F24H 9/2085; F24H 3/087; F24H 8/006; F23N 2225/21; F23N 2233/04; F23N 2233/08; F23N 2233/10; F23N 2239/04; F23N 2241/02; F23N 3/082; F23N 5/102; F23N 3/002

See application file for complete search history.

(56) References Cited

U.S. PATENT DOCUMENTS 3,274,990 A * 9/1966 MacCracken ........... F24H 3/105
126/110 R
3,353,529 A * 11/1967 Kovats ................ F24D 19/1084
126/110 E (Continued)

FOREIGN PATENT DOCUMENTS

| | | | |
|---|---|---|---|
| EP | 0039579 B1 * | 4/1987 | |
| WO | WO 99/49266 | 9/1999 | |

OTHER PUBLICATIONS

European Search Report dated Jan. 20, 2020.

*Primary Examiner* — Ljiljana V. Ciric

(74) *Attorney, Agent, or Firm* — KED & Associates LLP

(57) ABSTRACT

A method of controlling an RPM of a blower for a gas furnace that passes air to be supplied to a room around a heat exchanger of a gas furnace, the method including starting operation of the gas furnace; measuring an air temperature in an outlet side of the gas furnace; measuring the RPM of the blower; determining whether the air temperature falls within a reference temperature range; and adjusting the RPM of the blower such that the air temperature falls within the reference temperature range.

4 Claims, 3 Drawing Sheets

(51) Int. Cl.

| | |
|---|---|
| ***F24H 15/254*** | (2022.01) |
| ***F24H 15/414*** | (2022.01) |
| ***F24H 15/176*** | (2022.01) |
| ***F24H 15/128*** | (2022.01) |
| ***F24H 15/281*** | (2022.01) |

(56) References Cited

U.S. PATENT DOCUMENTS

| | | | | | |
|---|---|---|---|---|---|
| 3,494,551 | A * | 2/1970 | Snider | F24H 9/2085 | 337/321 |
| 3,921,899 | A * | 11/1975 | Hamilton | G05D 23/20 | 236/11 |
| 4,251,025 | A | 2/1981 | Bonne et al. | | |
| 4,533,315 | A * | 8/1985 | Nelson | F23N 1/065 | 431/90 |
| 4,702,225 | A * | 10/1987 | Heffernan | F24H 9/2085 | 165/104.11 |
| 4,708,636 | A * | 11/1987 | Johnson | F23N 1/02 | 431/12 |
| 4,751,886 | A * | 6/1988 | Koptis | F23N 1/002 | 110/193 |
| 5,024,379 | A * | 6/1991 | Dempsey | F24D 19/1009 | 236/78 D |
| 5,248,083 | A * | 9/1993 | Adams | F23N 1/062 | 236/11 |
| 5,572,104 | A * | 11/1996 | Nold | F23N 5/203 | 318/672 |
| 6,089,221 | A * | 7/2000 | Mano | F24H 15/31 | 236/11 |
| 6,758,208 | B2 * | 7/2004 | Gierula | F24H 3/087 | 236/11 |
| 9,188,362 | B2 * | 11/2015 | Potter, Sr. | F24H 3/0488 | |
| 9,625,177 | B2 * | 4/2017 | Hrejsa | F24H 3/065 | |
| 9,964,313 | B2 * | 5/2018 | Perez | F24H 15/156 | |
| 10,928,078 | B2 * | 2/2021 | Hrejsa | G05D 23/1932 | |
| 11,549,708 | B2 * | 1/2023 | Broker | G05B 19/048 | |
| 2002/0092516 | A1 * | 7/2002 | Gierula | F24H 3/087 | 126/110 R |
| 2002/0119408 | A1 * | 8/2002 | Eberspach | F23N 3/082 | 431/12 |
| 2004/0261831 | A1 * | 12/2004 | Tsuneoka | H10N 10/00 | 136/205 |
| 2005/0208443 | A1 * | 9/2005 | Bachinski | F23N 5/00 | 126/512 |
| 2007/0003891 | A1 * | 1/2007 | Jaeschke | F23N 5/18 | 431/19 |
| 2009/0308372 | A1 | 12/2009 | Nordberg et al. | | |
| 2012/0091214 | A1 * | 4/2012 | Rixen | F23N 3/08 | 237/5 |
| 2012/0251965 | A1 * | 10/2012 | Otto | F24H 3/025 | 126/116 A |
| 2015/0362217 | A1 * | 12/2015 | Dresser | F23N 3/082 | 237/53 |
| 2016/0255681 | A1 * | 9/2016 | Hadoulias | H05B 6/1209 | 219/629 |
| 2017/0059187 | A1 * | 3/2017 | Smith, Jr. | F24D 19/109 | |
| 2020/0072555 | A1 * | 3/2020 | Kim | F23N 3/002 | |
| 2021/0190365 | A1 * | 6/2021 | King | F24F 11/76 | |

* cited by examiner

RPM CONTROL METHOD OF BLOWER FOR GAS FURNACE

CROSS-REFERENCE TO RELATED APPLICATION

This application claims priority under 35 U.S.C. § 119 to Korean Application No. 10-2018-0103577 filed on Aug. 31, 2018, whose entire disclosure is hereby incorporated by reference.

BACKGROUND OF THE INVENTION

1. Field of the Invention

The present invention relates to a method of controlling a RPM of a blower for a gas furnace, and more particularly, to a method of controlling a RPM of a blower for a gas furnace that controls the RPM of the blower such that the temperature of an air in an outlet side of the gas furnace falls within a reference temperature range.

2. Description of the Related Art

Generally, a gas furnace is an apparatus that heats indoor air by exchanging the heat of air supplied to a room with a flame and a high temperature combustion gas that are generated when a fuel gas is burned.

If the temperature of the air supplied from the gas furnace to the room is too high or low, it may be uncomfortable to the occupant, so it is necessary to adjust it appropriately.

There is a problem that the temperature of the air supplied to the room from the gas furnace is too high or low because the temperature of the air in the outlet side of the gas furnace according to the related art is not monitored.

To solve this problem, when the air temperature in the outlet side of the gas furnace is higher than a reference temperature, the operation of the gas furnace is stopped by using a limit switch. However, there is a problem in that the air in the outlet side of the gas furnace is only prevented from being excessively overheated and not able to be maintained in an appropriate range.

SUMMARY OF THE INVENTION

The present invention has been made in view of the above problems, and provides a method of controlling an RPM of a blower for a gas furnace capable of maintaining the temperature of the air in the gas furnace outlet side in an appropriate temperature range that does not cause an uncomfortable feeling to the occupant.

The present invention further provides a method of controlling an RPM of a blower for a gas furnace, which can prevent a gas furnace from being overheated due to a foreign matter sticking to a filter, or the like.

In accordance with an aspect of the present invention, a method of controlling an RPM of a blower for a gas furnace that passes air to be supplied to a room around a heat exchanger of a gas furnace, includes: starting operation of the gas furnace; measuring an air temperature in an outlet side of the gas furnace; measuring the RPM of the blower; determining whether the air temperature falls within a reference temperature range; and adjusting the RPM of the blower such that the air temperature falls within the reference temperature range.

If it is determined that the air temperature is lower than a lower limit temperature of the reference temperature range, adjusting the RPM of the blower includes maintaining an inoperative state of the blower when the blower is not operating, and reducing a current RPM of the blower by a certain amount when the blower is operating.

Adjusting the RPM of the blower includes maintaining a current RPM of the blower, if it is determined that the air temperature falls within the reference temperature range.

Adjusting the RPM of the blower includes increasing a current RPM of the blower by a certain amount, if it is determined that the air temperature exceeds an upper limit temperature of the reference temperature range but is lower than a restriction temperature higher than the upper limit temperature.

The method further includes stopping an operation of the gas furnace, if it is determined that the air temperature exceeds the restriction temperature.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Figure 1:
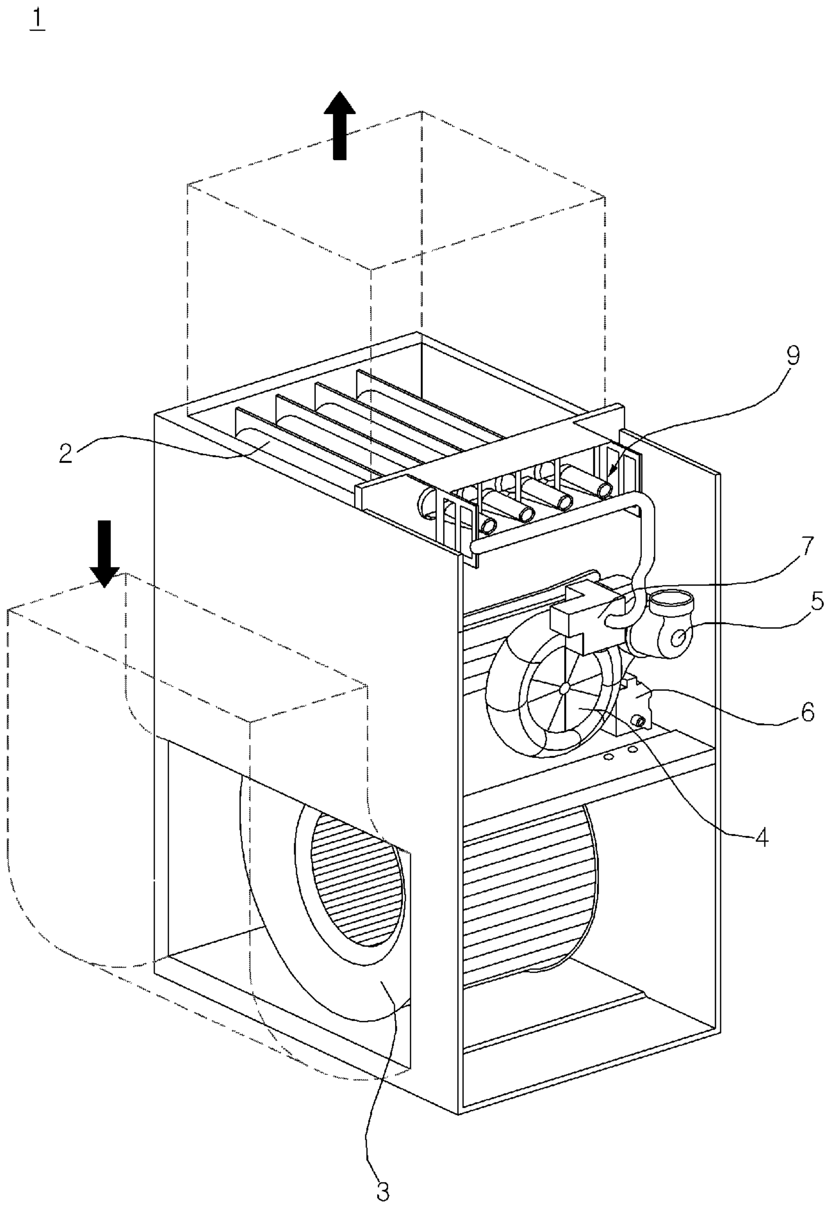
FIG. 1 is a perspective view of a gas furnace to which a method of controlling RPM of a blower for a gas furnace according to the present invention is applied.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

FIG. 1 is a perspective view of a gas furnace to which a method of controlling RPM of a blower for a gas furnace according to the present invention is applied.

Referring to FIG. 1, a gas furnace 1 according to the present invention will be described as follows.

The gas furnace 1 is an apparatus that heats the room by exchanging heat of the air supplied to the room with the flame and the combustion gas P of high temperature that are generated when the fuel gas R is burned.

As shown in FIG. 1, the gas furnace 1 includes a burner 9 in which the fuel gas R is burned to generate a combustion gas P, a heat exchanger 2 in which a gas flow path through which the combustion gas P flows, a blower 3 for gas furnace, and an inducer 4.

The fuel gas R is burned in the burner 9 so that the flame and the combustion gas P can be generated. Generally, liquefied natural gas (LNG) obtained by cooling and liquefying natural gas, or liquefied petroleum gas (LPG) obtained by pressurizing and liquefying a gas obtained as a byproduct of a petroleum refining process may be used as the fuel gas R.

The fuel gas R may be injected into a manifold from a gas valve 7 and sprayed toward a venturi tube through a nozzle (not shown).

A gas pipe through which the fuel gas R passes may be disposed between the gas valve 7 and the manifold. The gas valve 7 may be connected to the manifold by the medium of the gas pipe.

The gas valve 7 may open or close all or a part of the gas pipe.

The room can be heated by passing the air supplied to the room around the heat exchanger 2 through which the flame and the combustion gas P pass.

The heat exchanger 2 may be constituted by a first heat exchanger and a second heat exchanger.

One end of the first heat exchanger may be disposed adjacent to the burner 9. The other end opposite to one end of the first heat exchanger may be coupled to a coupling box (not shown). The combustion gas P passing from one end of the first heat exchanger to the other end may be transferred to the second heat exchanger through the coupling box.

One end of the second heat exchanger may be connected to the coupling box. The combustion gas P passed through the first heat exchanger may flow into one end of the second heat exchanger and pass through the second heat exchanger.

The second heat exchanger may exchange heat of the combustion gas P passed through the first heat exchanger once again with the air passing around the second heat exchanger.

That is, the efficiency of the gas furnace 1 may be improved by additionally using thermal energy of the combustion gas P that passed through the first heat exchanger through the second heat exchanger.

The combustion gas P passing through the second heat exchanger is condensed through a process of heat transfer with the air passing around the second heat exchanger to generate condensed water. In other words, the water vapor contained in the combustion gas P may condense and change its state to condensed water.

For this reason, the gas furnace 1 having the first heat exchanger and the second heat exchanger is also called a condensing gas furnace.

At this time, the generated condensed water may be collected in a condensed water collecting part (not shown). To this end, the other end opposite to one end of the second heat exchanger may be connected to one side of the condensed water collecting part.

An inducer 4 described later may be coupled to the other side of the condensed water collecting part. Hereinafter, for the sake of simplicity, it is described that the inducer 4 is coupled to the condensed water collecting part, but the inducer 4 may be coupled to a mounting plate to which the condensed water collecting part is coupled.

An opening may be formed in the condensed water collecting part. The other end of the second heat exchanger and the inducer 4 may communicate with each other by the medium of the opening formed in the condensed water collecting part.

That is, the combustion gas P that passed through the other end of the second heat exchanger may be escaped to the inducer 4 through the opening formed in the condensed water collecting part, and then discharged to the outside of the gas furnace 1 through an exhaust pipe 5.

The condensed water generated in the second heat exchanger may be discharged to the outside of the gas furnace 1 through a discharge port, after escaping to the condensed water trap 6 through the condensed water collecting part.

At this time, the condensed water trap 6 may be coupled to the other side of the condensed water collecting part. The condensed water trap 6 may collect and discharge not only the condensed water generated in the second heat exchanger but also the condensed water generated in the exhaust pipe 5 connected to the inducer 4.

That is, the condensed water, which is generated when the combustion gas P which has not condensed yet in the other end of the second heat exchanger passes through the exhaust pipe 5 and is condensed, may also be collected by the condensed water trap 6, and may be discharged to the outside of the gas furnace 1 through the discharge port.

The inducer 4 may communicate with the other end of the second heat exchanger by the medium of the opening formed in the condensed water collecting part.

One end of the inducer 4 may be coupled to the other side of the condensed water collecting part, and the other end of the inducer 4 may be coupled to the exhaust pipe 5.

The inducer 4 may cause a flow that the combustion gas P passes through the first heat exchanger, the coupling box, and the second heat exchanger and is discharged to the exhaust pipe 5. In this regard, the inducer 4 may be understood as an Induced Draft Motor (IDM).

The blower 3 for gas furnace may be positioned below the gas furnace 1. The air supplied to the room may be moved from the lower portion of the gas furnace 1 to the upper portion by the blower 3 for gas furnace. In this respect, the blower 3 for gas furnace may be understood as Indoor Blower Motor (IBM).

The blower 3 for gas furnace may pass air around the heat exchanger 2.

The air passing around the heat exchanger 2 by the blower 3 for gas furnace may receive the thermal energy from the combustion gas P of high temperature by the medium of the heat exchanger 2 so that the temperature can be raised. The air whose temperature is raised is supplied to the room, thereby heating the room.

Hereinafter, the air passed around the heat exchanger 2 by the blower 3 for gas furnace will be referred to as the air in the outlet side of the gas furnace.

The air in the outlet side of the gas furnace may be supplied to a room to be heated.

Therefore, if the air temperature T in the outlet side of the gas furnace is too high or low, there is a problem that the occupant may feel uncomfortable.

The present invention has been made to solve the above-mentioned problems, and provides a method of maintaining the temperature T of the air in the outlet side of the gas furnace at an appropriate temperature range, which will be described later in detail.

The gas furnace 1 may include a case (not shown). The above described configurations of the gas furnace 1 may be accommodated in the case. In the lower portion of the case, a lower side opening (not shown) may be formed in the side surface adjacent to the blower 3 for gas furnace. The air passing around the heat exchanger 2 may be introduced into the case through the lower side opening.

An opening (not shown) for exhaust pipe through which the exhaust pipe 5 passes may be formed in the upper portion of the case, but the position is not limited thereto.

In the upper portion of the case, an upper side opening (not shown) may be formed in the side surface adjacent to the upper side of the heat exchanger 2. The air that passed around the heat exchanger 2 and has a raised temperature may be discharged to the outside of the case through the upper side opening and supplied to the room.

A duct (not shown) for communicating the gas furnace 1 with the indoor space, which is a space to be heated, may be provided in the lower side opening and the upper side opening.

A filter (not shown) for filtering foreign substances such as dust in the air may be provided between the lower side opening and the duct provided therein.

If foreign substances are stuck to the filter, there occurs a problem in supplying air into the gas furnace 1, which may result in an excessively high air temperature T in the outlet side of the gas furnace in comparison with the normal case.

The present invention has been made to solve the above problems, and provides a method of stopping the operation of the gas furnace when the air temperature T in the outlet side of gas furnace is excessively high, which will be described in detail later.

As described above, since the second heat exchanger further uses the thermal energy of the combustion gas P that passed through the first heat exchanger, it can be easily understood that the efficiency of the gas furnace using the first and second heat exchangers is superior to that of the gas furnace using only the first heat exchanger.

The control method of the blower 3 for gas furnace according to the present invention can be applied not only to the gas furnace using only the first heat exchanger but also to the gas furnaces to which both the first and second heat exchangers are applied.

Hereinafter, a control method of the blower 3 for gas furnace according to the present invention will be described in detail.

As described above, if the air temperature T in the outlet side of gas furnace is too high or low, it may cause an unpleasant feeling to the occupant, so it is necessary to appropriately adjust the temperature T in the outlet side of gas furnace.

However, the present invention has an aim to appropriately adjust the temperature of the air to be supplied to the room from the viewpoint of thermal comfort, and differs from how the room temperature must be heated to reach a set temperature set by the user.

Since the heating energy supplied to the room is determined according to the difference between the room temperature and the set temperature, the heating energy (rate) supplied to the room may be the same irrespective of how to control the revolution per minute (RPM) of the blower 3 for gas furnace according to the present invention.

In other words, when the mass flow rate of the fuel gas R flowing into the burner 9 is constant, if the RPM of the blower 3 for gas furnace is decreased, the air flow rate in the outlet side of gas furnace will decrease and the temperature will increase. If the RPM of the blower 3 for gas furnace is increased, the air flow rate in the outlet side of gas furnace will increase and the temperature will decrease. However, in any case, the heating energy (rate) supplied to the room is constant, so that the time during which the room temperature reaches the set temperature may be the same.

Therefore, it is not considered in the present invention to adjust the mass flow rate of the fuel gas R flowing into the burner 9 to adjust the air temperature T in the outlet side of gas furnace. It can be understood that the object of the present invention is to control the RPM of the blower 3 for gas furnace described later to adjust the air temperature T in the outlet side of gas furnace.

Figure 2:
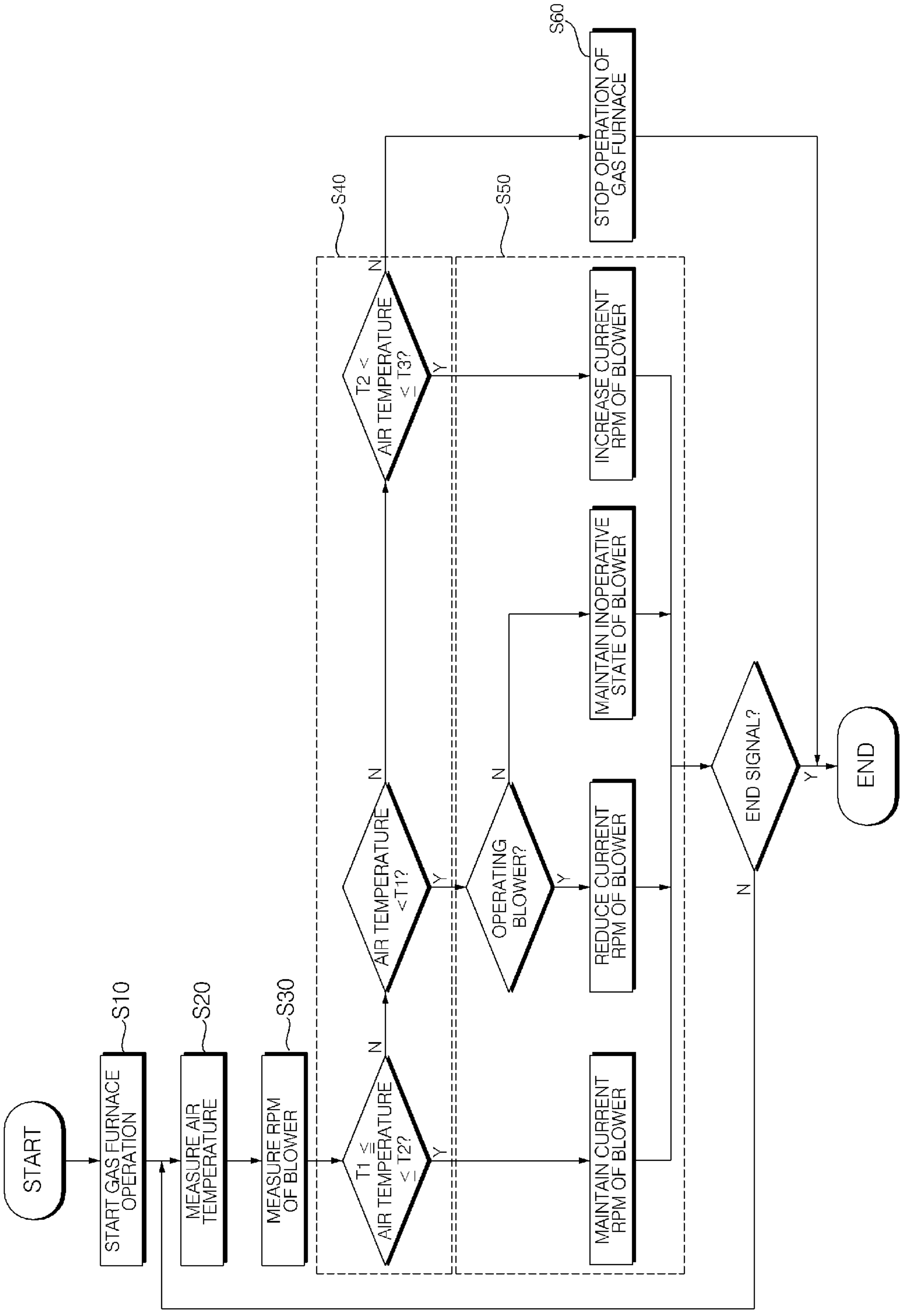
FIG. 2 is a flowchart of a method of controlling RPM of a blower for a gas furnace according to the present invention.
Figure 3:
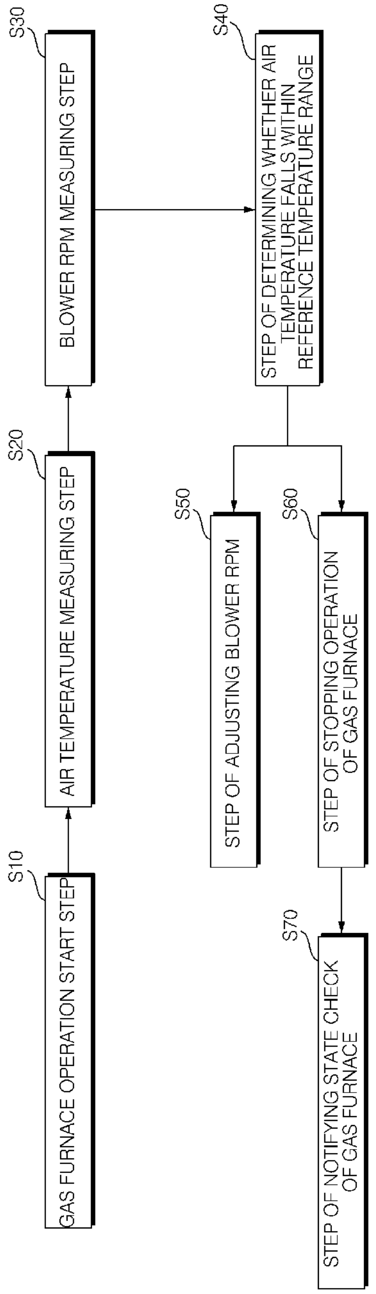
FIG. 3 is a view showing a RPM control configuration of a blower for a gas furnace according to the present invention.

FIG. 2 is a flowchart of a method of controlling RPM of a blower for a gas furnace according to the present invention, and FIG. 3 is a view showing a RPM control configuration of a blower for a gas furnace according to the present invention.

Referring to FIGS. 2 and 3, the method of controlling RPM of a blower for a gas furnace according to the present invention may include a gas furnace operation start step (S10), an air temperature measuring step (S20), a blower RPM measuring step (S30), a step (S40) of determining whether the air temperature falls within a reference temperature range, and a step (S50) of adjusting the blower RPM.

The gas furnace operation start step (S10) may be a step of starting the heat exchange between the air to be supplied indoors with the flame and the combustion gas P of a high temperature generated in the burner 9 due to the combustion of the fuel gas R, as there is a difference between the room temperature and a set temperature or desired temperature inputted by a user.

The room temperature may reach the set temperature as the operation of the gas furnace 1 is started in the gas furnace operation start step (S10). At this time, the mass flow rate of the fuel gas R supplied to the burner 9 may be determined according to a difference between the room temperature and the set temperature.

Hereinafter, for the sake of simplicity, it is assumed that the mass flow rate of the fuel gas R supplied to the burner 9 is constant.

After the gas furnace operation start step (S10), the air temperature measuring step (S20) may be performed. In the air temperature measuring step (S20), the air temperature T in the outlet side of gas furnace may be measured.

In the air temperature measuring step (S20), the air temperature T in the outlet side of gas furnace may be measured through a temperature measuring unit 10.

The temperature measuring unit 10 may include a thermocouple 11 that generates thermal electromotive force according to the air temperature T in the outlet side of gas furnace.

The thermocouple 11 is a device using a Seebeck effect.

Here, the Seebeck effect can be explained as the effect of generating thermal electromotive force proportional to a temperature difference between two contact points when two different metals are bonded.

Metals used for the thermocouple 11 include platinum-platinum rhodium, chromel-alumel, iron-constantane, copper-constantane, and the like.

When one of the two contact points is used as a reference point and the other contact point is used as a measurement point, if the measurement point is positioned at a site where a temperature is to be measured, the temperature difference between the reference point and the measurement point can be known by the magnitude of the thermal electromotive force, and the temperature of the site to be measured can be measured by comparing with the temperature of the reference point.

In the present invention, the thermocouple 11 may be installed inside the gas furnace 1 such that the measurement point of the thermocouple 11 is disposed in the outlet side of gas furnace.

The air temperature measuring step (S20) may be a step of measuring the air temperature T in the outlet side of the gas furnace based on the magnitude of the thermal electromotive force generated by the thermocouple 11.

The information on the air temperature T in the outlet side of the gas furnace measured in the air temperature measuring step (S20) may be transmitted to a controller 20 described later.

After the air temperature measuring step (S20), the blower RPM measuring step (S30) may be performed. Alternatively, it is also possible that the blower RPM measuring step (S30) is performed before the air temperature measuring step (S20).

In the blower RPM measuring step (S30), since a generally known conventional RPM measuring apparatus can be used, a detailed description will be omitted.

As the RPM of the blower 3 increases, the amount of air supplied to the room through the gas furnace 1 may increase. On the other hand, as the RPM of the blower 3 decreases, the amount of air supplied to the room through the gas furnace 1 may decrease.

The information on the RPM of the blower 3 measured in the blower RPM measuring step (S30) may be transmitted to the controller 20.

After the blower RPM measuring step S30, the step (S40) of determining whether the air temperature T in the outlet side of gas furnace falls within a reference temperature range may be performed.

The step (S40) of determining whether the air temperature T in the outlet side of gas furnace falls within a reference temperature range may be performed through the controller 20.

The controller 20 may be an electronic control unit (ECU).

The controller 20 may be implemented by using at least one of an application specific integrated circuit (ASIC), digital signal processors (DSPs), digital signal processing devices (DSPDs), programmable logic devices (PLDs), field programmable gate arrays (FPGAs), processors, controllers, micro-controllers, microprocessors, and other electronic units for performing other functions.

The controller 20 may be electrically connected to the temperature measuring unit 10 and the blower RPM measuring apparatus.

The controller 20 may receive information on the air temperature T in the outlet side of gas furnace and the RPM of the blower 3 from each of the temperature measuring unit 10 and the blower RPM measuring apparatus.

The step (S40) of determining whether the air temperature T in the outlet side of gas furnace falls within a reference temperature range may be a step of determining by comparing the air temperature T in the outlet side of gas furnace received from the temperature measuring unit 10 with the reference temperature range by the controller 20.

Here, the reference temperature range is a range of temperature in which occupants feel comfortable, and may be between temperatures T1 and T2. That is, the temperature T1 is the lower limit temperature of the reference temperature range, and the temperature T2 is the upper limit temperature of the reference temperature range.

That is, if the air temperature T in the outlet side of gas furnace falls within the reference temperature range, the occupant may feel comfort.

If the air temperature T in the outlet side of gas furnace is lower than the temperature T1 or higher than the temperature T2, the occupant may feel discomfort.

The temperatures T1 and T2 may be preset temperature values, but may be a temperature value arbitrarily set by a user as the temperature range in which each user feels comfortable may vary.

The step (S40) of determining whether the air temperature T in the outlet side of gas furnace falls within a reference temperature range may be a step of determining whether the air temperature T in the outlet side of gas furnace falls between the temperatures T1 to T2.

As shown in FIG. 2, when it is determined that the air temperature T in the outlet side of gas furnace falls between the temperatures T1 and T2, the controller 20 may transmit a first control signal to the blower 3 so that the current RPM of the blower 3 can be maintained.

If it is determined that the air temperature T in the outlet side of gas furnace is lower than the temperature T1, the controller 20 may transmit a following control signal to the blower 3 depending on whether the blower 3 is operating.

That is, if the blower 3 is not operating, the controller 20 may transmit a second control signal for maintaining the inoperative state of the blower 3 to the blower 3.

However, if the blower 3 is operating, the controller 20 may transmit a third control signal to the blower 3 so that the current RPM of the blower 3 can be reduced by a certain amount.

If it is determined that the air temperature T in the outlet side of gas furnace is higher than the temperature T2 but lower than the temperature T3, the controller 20 may transmit a fourth control signal for increasing the current RPM of the blower 3 by a certain amount to the blower 3.

Here, the temperature T3 is a temperature (restriction temperature) higher than the temperature T2, and may be understood as a temperature in the case where the gas furnace 1 is overheated due to a foreign substance sticking to the filter or the like as described above.

However, if it is determined that the air temperature T in the outlet side of gas furnace is higher than the temperature T3, the controller 20 may transmit a fifth control signal for stopping the operation of gas furnace 1 to the gas furnace 1.

After the step S40 of determining whether the air temperature T in the outlet side of gas furnace falls within the reference temperature range, the step (S50) of adjusting the blower RPM may be performed.

The step (S50) of adjusting the blower RPM may be a step of adjusting the RPM of the blower 3 according to the control signal received from the controller 20.

The control signal transmitted by the controller 20 may be a command signal for adjusting the RPM of the blower 3 so that the air temperature T in the outlet side of gas furnace falls within the reference temperature range, i.e., between the temperatures T1 and T2.

As described above, in the case where the mass flow rate of the fuel gas R supplied to the burner 9 is constant, when the RPM of the blower 3 is increased, the mass flow rate of the air passing through the outlet side of gas furnace increases, but the temperature T is lowered. On the other hand, when the RPM of the blower 3 is decreased, the mass flow rate of the air passing through the outlet side of gas furnace decreases, but the temperature T may be raised.

The blower RPM control step S50 may be a step of adjusting the RPM of the blower 3 so that the air temperature T in the outlet side of gas furnace falls between the temperatures T1 and T2 by using the above-described principle.

That is, as shown in FIG. 2, when it is determined that the air temperature T in the outlet side of gas furnace falls between the temperatures T1 and T2 and the first control signal is transmitted from the controller 20 to the blower 3, the current RPM of the blower 3 can be maintained intactly. Thus, the air temperature T in the outlet side of gas furnace can be maintained between the temperatures T1 and T2.

When it is determined that the air temperature T in the outlet side of gas furnace is lower than the temperature T1 and the second or third control signal is transmitted from the controller 20 to the blower 3, the RPM of the blower 3 can be adjusted as follows.

That is, when the blower 3 is not operating, the second control signal is transmitted to the blower 3 from the controller 20 so that the inoperative state of the blower 3 can be maintained. Thus, the air temperature T in the outlet side of gas furnace may be increased beyond the temperature T1, and fall between the temperature T1 and the temperature T2.

However, if the blower 3 is operating, the third control signal is transmitted to the blower 3 from the controller 20 so that the current RPM of the blower 3 can be reduced by a certain amount. Thus, the air temperature T in the outlet side of gas furnace may be increased beyond the temperature T1, and fall between the temperature T1 and the temperature T2.

When it is determined that the air temperature T in the outlet side of gas furnace is higher than the temperature T2 but is equal to or lower than the temperature T3 and the fourth control signal is transmitted to the blower 3 from the controller 20, the current RPM of the blower 3 can be increased by a certain amount. Thus, the air temperature T in the outlet side of gas furnace may be reduced to be lower than the temperature T2 and fall between the temperatures T1 and T2.

However, if it is determined that the air temperature T in the outlet side of gas furnace is higher than the temperature T3 and the fifth control signal is transmitted to the gas furnace 1 from the controller 20, a step (S60) of stopping the operation of gas furnace may be further included.

The step (S60) of stopping the operation of the gas furnace may be a step of stopping the operation of the gas furnace 1 according to the fifth control signal received from the controller 20.

When no further combustion process occurs as the supply of the fuel gas R to the burner 9 is interrupted, according to the step (S60) of stopping the operation of the gas furnace, the air temperature T in the outlet side of gas furnace is reduced to be lower than the temperatures T3 and T2 and may fall between the temperatures T1 and T2.

After the step (S60) of stopping the operation of the gas furnace, a step S70 of notifying the state check of gas furnace may be performed.

The step S70 of notifying the state check of gas furnace may be a step of notifying a user that the state check of gas furnace is required.

That is, if the flow rate of the air passing through the outlet side of the gas furnace is greatly reduced and the temperature T becomes excessively high (i.e., higher than the temperature T3) due to the foreign matter sticking to the filter, this can be informed to the user so that the check of gas furnace state can be guided to perform.

The step S70 of notifying the state check of gas furnace may notify the user of the necessity of state check through a display unit of the thermostat.

Here, the thermostat may be a temperature control device that displays the temperature of the indoor space to be heated, to the consumer, and allows the consumer to input a set temperature or desired temperature.

The gas furnace 1 is installed in a space (e.g., a basement) which is away from the indoor space to be heated. However, since the thermostat is usually installed in the indoor space, the occupant can check the bad state of the gas furnace 1 in the room without having to go directly to the space where the gas furnace 1 is installed.

According to the present invention, there are one or more of the following effects.

First, the RPM of the blower is adjusted in such a manner that the air temperature in the outlet side of gas furnace falls within the reference temperature range, thereby heating the room in a comfortable situation.

Second, if the air temperature in the outlet side of the gas furnace exceeds the restriction temperature, the operation of the gas furnace is stopped, thereby preventing the gas furnace from being excessively overheated.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. A method of controlling an RPM of a blower for a gas furnace that passes air to be supplied to a room around a heat exchanger of the gas furnace, the method comprising:

starting operation of the gas furnace;

measuring an air temperature at an outlet side of the gas furnace;

measuring the RPM of the blower;

determining whether the air temperature falls within a reference temperature range having a lower limit temperature and an upper limit temperature, or whether the air temperature is lower than the lower limit temperature of the reference temperature range, in response to the determination that the air temperature is lower than the lower limit temperature and based on a determination that the blower is not operating, transmitting a first control signal to the blower and thereby maintaining an inoperative state of the blower, in response to the determination that the air temperature is lower than the lower limit temperature and based on a determination that the blower is operating, transmitting a second control signal to the blower and thereby reducing a current RPM of the blower by a certain amount, and in response to the determination that the air temperature falls within the reference temperature range having the lower limit temperature and the upper limit temperature, transmitting a third control signal to the blower and thereby maintaining a current RPM of the blower.

2. The method of claim 1, further comprising increasing a current RPM of the blower by transmitting a fourth control signal to the blower, if it is determined that the air temperature exceeds the upper limit temperature but is lower than a restriction temperature higher than the upper limit temperature.

3. The method of claim 2, further comprising stopping an operation of the gas furnace by transmitting a fifth control signal to the gas furnace, if it is determined that the air temperature exceeds the restriction temperature.

4. The method of claim 3, further comprising, after stopping the operation of the gas furnace, notifying a user that a state check of the gas furnace is required.

* * * * *